US00RE47552E

(19) United States
(12) Reissued Patent
Zhou

(10) Patent Number: US RE47,552 E
(45) Date of Reissued Patent: Aug. 6, 2019

(54) AERATOR WITH DUAL SPRAYING FUNCTIONS

(71) Applicant: XIAMEN WATER NYMPH SANITARY TECHNOLOGY CO., LTD., Xiamen, Fujian (CN)

(72) Inventor: Huaqiang Zhou, Xiamen (CN)

(73) Assignee: XIAMEN WATER NYMPH SANITARY TECHNOLOGY CO., LTD., Xiamen (CN)

(21) Appl. No.: 15/816,677

(22) Filed: Nov. 17, 2017

Related U.S. Patent Documents

Reissue of:
(64) Patent No.: 9,205,436
Issued: Dec. 8, 2015
Appl. No.: 14/225,454
Filed: Mar. 26, 2014

(30) Foreign Application Priority Data

Apr. 4, 2013 (CN) ..... 2013 1 0115518

(51) Int. Cl.

| | |
|---|---|
| ***B01F 3/04*** | (2006.01) |
| ***B05B 1/16*** | (2006.01) |
| ***B05B 7/04*** | (2006.01) |
| ***E03C 1/084*** | (2006.01) |
| *B05B 15/654* | (2018.01) |

(52) U.S. Cl.
CPC ..... *B05B 7/0425* (2013.01); *B05B 1/1636* (2013.01); *E03C 1/084* (2013.01); *B05B 15/654* (2018.02)

(58) Field of Classification Search
CPC ..... E03C 1/084
See application file for complete search history.

(56) References Cited

U.S. PATENT DOCUMENTS

| | | | | |
|---|---|---|---|---|
| 3,524,591 | A * | 8/1970 | Samuels | E03C 1/084 239/428.5 |
| 3,829,026 | A * | 8/1974 | Aghnides | E03C 1/084 239/394 |
| 4,733,819 | A * | 3/1988 | Aghnides | B05B 1/1654 239/428.5 |
| 5,348,231 | A * | 9/1994 | Arnold | E03C 1/084 239/428.5 |
| 7,374,366 | B2 * | 5/2008 | Tasi | E03C 1/084 210/456 |
| 2009/0166450 | A1 * | 7/2009 | Kao | E03C 1/084 239/428.5 |
| 2012/0061492 | A1 * | 3/2012 | Peng | E03C 1/084 239/548 |

(Continued)

*Primary Examiner* — Elizabeth L McKane
(74) *Attorney, Agent, or Firm* — Stein IP, LLC

(57) ABSTRACT

Disclosed is an aerator with dual spraying functions, including a flow control assembly, a water separator, and a water dispenser that are combined with a housing. The flow control assembly and the water separator are combined together and the water separator and the water dispenser are rotatably connected to each other. The water separator has a surface in which discharge holes are formed. The water dispenser has an internal chamber having a circumferential portion in which needle-like water channels are formed to correspond to the water separator. Bubbling water passages are formed between the needle-like water channels and a central portion surrounded by the needle-like water channels defines a bubbling water channel.

18 Claims, 9 Drawing Sheets

(56) References Cited

U.S. PATENT DOCUMENTS

| | | | | |
|---|---|---|---|---|
| 2013/0049235 | A1* | 2/2013 | Lin | E03C 1/084<br>261/5 |
| 2013/0134235 | A1* | 5/2013 | Blum | E03C 1/084<br>239/428.5 |

* cited by examiner

NEW

AERATOR WITH DUAL SPRAYING FUNCTIONS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD OF THE INVENTION

The present invention generally relates to an aerator applicable to a water discharge end of a water discharge device, such as a faucet, a spraying gun, a bidet, and a showerhead, and more particularly to an aerator with dual spraying functions of needle-like spray and bubbling spray.

DESCRIPTION OF THE PRIOR ART

A water discharge end of a sanitary device, such as a basin faucet, a kitchen faucet, a pull-out faucet, a spraying gun, a bidet, a showerhead, is often equipped with an aerator. The function of the aerator is to supply a bubbling spray or a needle-like spray corresponding to the sites of applications and to supply sprays of flow rate that correspond to areas of different water pressure and different sites of applications in order to provide users with satisfactory washing effect while saving as much water as possible.

Most of the conventional basin faucets supply only bubbling water or needle-like water and there is generally no compact aerator that can be mounted to a basin faucet to switch between bubbling water and needle-like water. The consumers are only allowed to select between the needle-like spray aerator and the bubbling spray aerator. It is generally not possible to provide the consumers with two options and this may not suit the actual needs of the consumers for various types of cleansing jobs.

Although conventional kitchen faucets are often provided with a device for switching between a bubbling spray and a needle-like spray, in an operation of needle-like spray, a sealing structure must be preset between the needle-like water passage and the surrounding air or bubbling water passage. This makes the product complicated in structure and large in size, being not allowed to directly fit into a threading connection housing, whereby the entire faucet shows a complicated overall configuration and requires a high cost.

A conventional pull-out faucet [is] generally provides options for switching between bubbling spray and needle-like spray; however, there are generally too many openings for needle-like spray to provide sufficient jetting power, whereby it may not suit the need for use in applications where powerful jetting is needed.

A conventional spraying gun provides a single spray function of needle-like spray and it [dost] *does* suit the need for applications where soft and not-splashing spray is required.

A conventional bidet provides only a single type of spray for bubbling water or needle-like water. However, the requirement for the force that is applied to wash and the degree of cleanliness is different from person to person and from people to people. A single type of spray for bubbling water or needle-like water is just not sufficient to suit the need of the user for cleanliness.

The basin faucets, the kitchen faucets, the pull-out faucets, the spraying guns, the bidets, and the showerheads that are available in the market generally have a single function of needle-like spraying or bubbling spraying. As shown in FIGS. 1A and 1B, schematic views of a conventional single bubbling spray function aerator are provided. The aerator 9 has an inner core 91 that is fit into a threaded housing 92. The inner core comprises a water separator 911 positioned on an internal step of the threaded housing 92. After the inner core 91 is assembled in the threaded housing 92, there is no obvious projection of the inner core 91 outside the threaded housing 92. The aerator 9 has a water discharge end where only grid-like discharge holes 912 are formed to provide a single type of spray. The inner core 91 does not extend outside the threaded housing 92 and is thus not accessible for rotation to achieve switching. When water flows through the water separator 911 to fast jet out, a negative pressure is induced around the water discharge openings of the water separator 911 to draw in air through a gap between the threaded housing 92 and the inner core 91 to mix with water for formation of a bubbling spray, which after being subjected to regulation by the grid-like discharge holes 912, is dispensed.

As shown in FIGS. 2A and 2B, schematic views showing another conventional single needle-like spray function aerator are provided. The aerator 8 has an inner core 81 that is similarly positioned on the threaded housing 82. Similarly, the inner core 81 does not extend outside the threaded housing 82 for being accessed for rotation to achieve switching. Discharge holes 812 are distributed in a circle. The inner core 81 has a single channel that draws in water from an inlet end and discharges water through the discharge holes 81 so that no negative pressure is induced for drawing in air. The inner core 81 is often provided with a flow controller 811. The flow controller 811 takes advantage of the variation of cross-sectional area induced by variation of pressure to control the size of a flow channel so as to achieve control of the flow rate.

As shown in FIGS. 3A and 3B, schematic views showing a conventional aerator with both bubbling spray and needle-like spray are provided. The aerator 7 has an inner core 71 having an outside diameter that is greater than an outside diameter of a thread 72 for connection with a faucet. This makes it impossible for the inner core 71 to fit inside the thread 72. The inner core comprises needle-like water channels 711 and a bubbling water channel 712 that are sealed with respect to each other during the dispensing of water. The aerator achieves switching between bubbling spray and needle-like spray through up and down movements of the inner core 71.

Among the conventional aerators, those allowing for direct fitting into a threaded housing that is combined with a faucet have a single type of bubbling spray or needle-like spray, making it not suit the needs of the general consumers for selection between two types of spray. The conventional aerator that has functions for both needle-like spray and bubbling spray does not allow for direct fitting into a threaded connector that is combined with a faucet. Further, the conventional aerator uses a rubber sealing ring to realize switching for the needle-like water channels to be sealed with respect to the outside atmosphere and also allowing for rotation. A product manufactured in this way is complicated and large in size and further, the switching operation is extremely difficult and may lead to jamming of the rubber member with plastic members after long-term operation and accumulation of scales, eventually resulting in incapability of switching.

SUMMARY OF THE INVENTION

An object of the present invention is to provide an aerator with dual spraying functions that allows for direct fitting into a threaded housing, is easy to switch between two types of sprays of a needle-like spray and a bubbling spray, has an extended life span, has a reduced number of parts, and provides flow control.

To achieve the above object, a solution adopted by the present invention is as follows:

An aerator with dual spraying functions comprises a housing, a flow control assembly, a water separator, and a water dispenser, wherein the flow control assembly and the water separator are combined together and the water separator and the water dispenser are rotatably connected together, the water dispenser having a lower portion to which a water dispensing net is mounted; the flow control assembly, the water separator, and the water dispenser are combined with the housing to be coupled, via a sealing gasket, to a water discharge device, the water dispenser being arranged to partially extend outside the housing; the water separator comprises a T-shaped disk having a disk surface in which discharge holes are formed in an equally spaced manner in an area adjacent to a circumference of the disk, each of the discharge holes having an upper end, where an energy accumulation pool; and the water dispenser comprises a sleeve having an internal chamber that is provided, in a circumferential portion thereof, with uniformly distributed needle-like water channels respectively corresponding to the discharge holes of the water separator, needle-like water discharge holes being formed in a lower end of the water dispenser to correspond to the needle-like water channels, bubbling water passages being formed between the needle-like water channels, a central portion surrounded by the needle-like water channels defining a bubbling water channel, grid-like discharge holes being mounted to discharge holes at a lower end of the bubbling water channel.

The water dispensing net that comprises grid-like discharge holes is mounted to the discharge holes of a lower end of the water dispenser.

The flow control assembly comprises a top lid, an elastic body, and a bottom base, wherein the elastic body has a circumference from which at least two pawls extend downward, the top lid covering atop the bottom base with the elastic body interposed between the bottom base and the top lid, the top lid comprising through apertures formed therein, the bottom base having a non-central portion on which at least one raised peg is formed.

Two adjacent discharge holes are formed in each individual energy accumulation pool of the water separator to define a water jet.

An elongate discharge hole is formed in each individual energy accumulation pool of the water separator.

Upper inside surfaces of the needle-like water channels are connected to each other by an inner circumferential wall, inner circumferential wall comprising positioning recesses formed on an inner side thereof.

The water separator has a central portion on an underside of which posts that comprise resilient cutoffs and barbs are formed and positioning projections are formed on outside surfaces of the posts.

Two adjacent discharge holes are formed in each individual energy accumulation pool of the water separator to define a water jet.

An elongate discharge hole is formed in each individual energy accumulation pool of the water separator.

Upper inside surfaces of the needle-like water channels are connected to each other by an inner circumferential wall, inner circumferential wall comprising positioning recesses formed on an inner side thereof.

The needle-like water channels of the water dispenser are arranged to reduce from a large-sized upper end toward a small-sized lower end.

Upper inside surfaces of the needle-like water channels are connected to each other by an inner circumferential wall, inner circumferential wall comprising positioning recesses formed on an inner side thereof.

The needle-like water channels of the water dispenser have a minimum water discharge cross-sectional area that is greater than a minimum water discharge cross-sectional area of the discharge holes of the water separator.

A ring pad that mates an outer circumference of the bottom of the water separator is arranged between the water dispenser and the water separator.

The water dispenser that partially extends outside the housing comprises a decoration ring fit thereto.

By adopting the above solution, the present invention comprises needle-like water channels and a bubbling water channel that are arranged in the water dispenser to be alignable with the discharge holes of the water separator and in communication with the outside atmosphere and achieves switching through rotation by means of a water separator and a water dispenser that are rotatable with respect to each other so as to achieve selective switching between needle-like spray and bubbling spray. The aerator according to the present invention has a compact size, a simple structure, and a reduced cost. The rotation switching helps extend the service life of a product. The housing is combinable with a faucet, a spraying gun, a pull-out sprinkler, and a bidet, having excellent commonality and simplified structure. The arrangement of a flow control assembly helps provide similar spraying effect for water spray with both low pressure and high pressure and achieve energy saving and environmental conservation.

Thus, the present invention possesses the following advantages:

The aerator has an inner core assembly that has a maximum outside diameter that is smaller than the inner diameter of a thread of a threaded housing of the aerator so that the water dispenser can be directly fit into the threaded housing of the aerator. The water dispenser, after fit into the threaded housing, has a portion extending outside the threaded housing. The portion that extends outside the housing can be gripped by a hand for rotation to achieve switching between a needle-like spray and a bubbling spray.

The switching is achieved with rotation and during the use and the process of switching, the needle-like water channels and the bubbling water channel of the water dispenser are in communication with the external atmosphere and no sealing structure is necessary among them.

In case of being switched to the needle-like spray, each of the needle-like spray discharge holes of the water dispenser has a minimum cross-sectional area that is greater than the spray cross-sectional area where the water separator injects into the needle-like spray discharge hole of the water dispenser. This ensures that the spray, after being injected from the water separator into a large-sized end of needle-like spray discharge hole of the water dispenser, will follow a small-sized end of the needle-like spray discharge hole for fast jetting without causing any blocking of the water that leads to overflowing through the large-sized end of the needle-like spray discharge hole. This allows for elimination of the requirement for sealing of the needle-like water channels and other spaces in communication therewith.

In case of being switched to the bubbling spray, fast jetting of water flow from the water separator induces a negative pressure area nearby so that atmosphere is drawn into the negative area through the needle-like spray discharge holes of the water dispenser and a gap between the water dispenser and the threaded housing and the water separator. The air entering the negative pressure area is mixed with water to form a bubbling spray. The bubbling spray is first jetted to the water dispenser for buffering and then regulated and jetted by the water dispensing net so as to make the bubbling spray smooth and soft.

The aerator has a function of flow control. The flow control allows the sprays to be of substantially the same spraying effect for both low pressure and high pressure and achieves energy saving and environmental conversation.

The discharge holes of the water separator are each provided, at an upper end thereof, with an energy accumulation pool. The energy accumulation pool allows the spray discharged from the water separator to obtain a more stabilized water pressure before discharging so as to provide the discharged water with a high and stable jetting speed, making it helpful in forming a negative pressure around a water discharge opening of the water separator and the spray being fuller and softer.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1A:
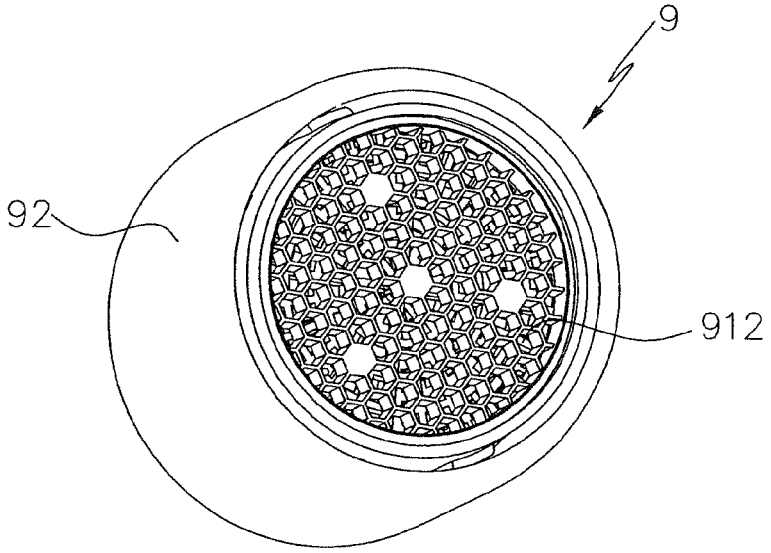
PRIOR ART FIG.1A
FIG. 1A is a schematic view showing the structure of a conventional single bubbling spray function aerator.
Figure 1B:
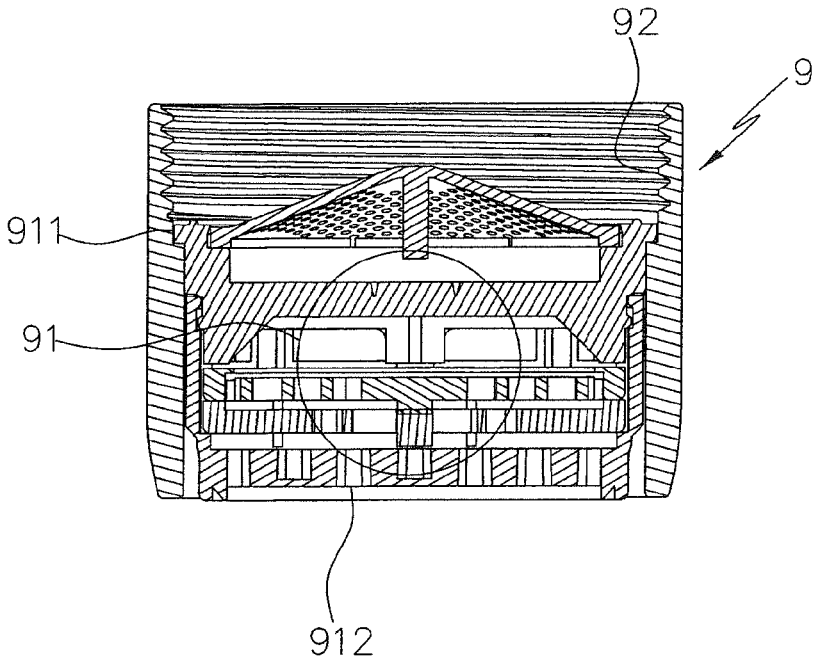
PRIOR ART FIG.1B
FIG. 1B is a cross-sectional view showing the conventional single bubbling spray function aerator.
Figure 2A:
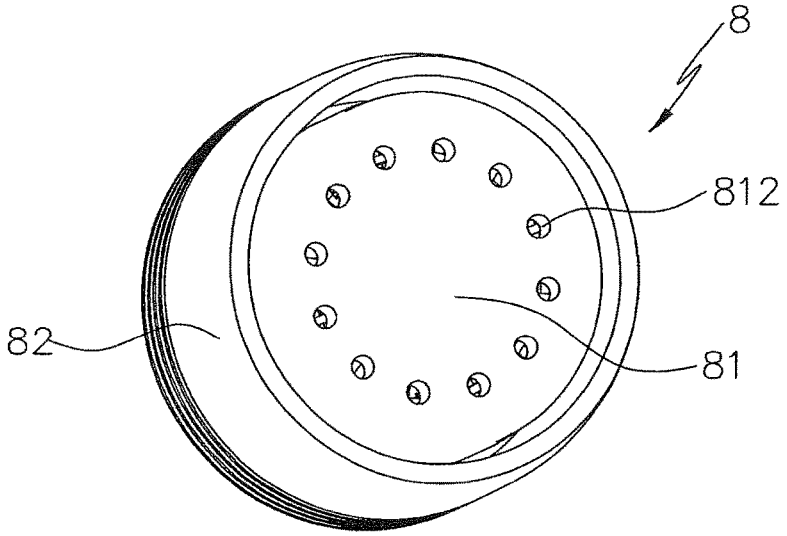
PRIOR ART FIG.2A
FIG. 2A is a schematic view showing the structure of a conventional single needle-like spray function aerator.
Figure 2B:
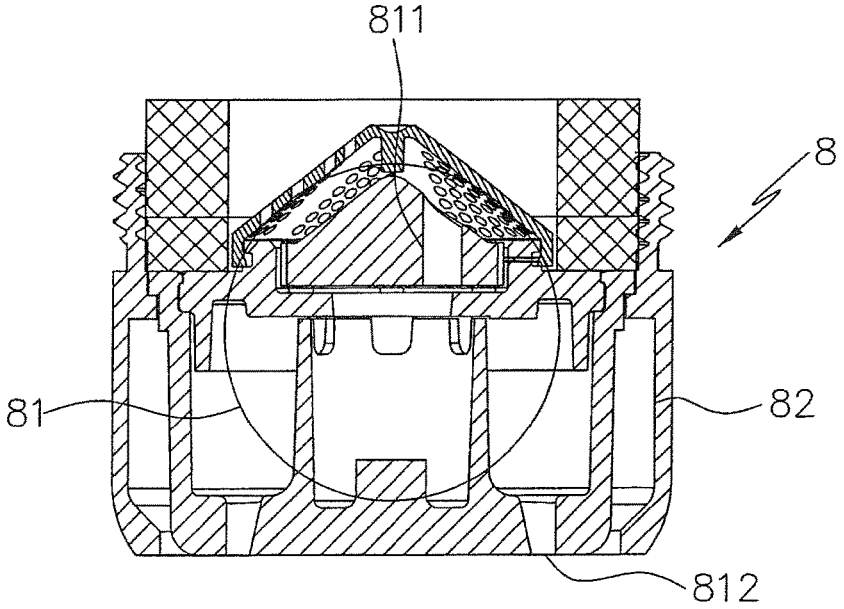
PRIOR ART FIG.2B
FIG. 2B is a cross-sectional view showing the conventional single needle-like spray function aerator.
Figure 3A:
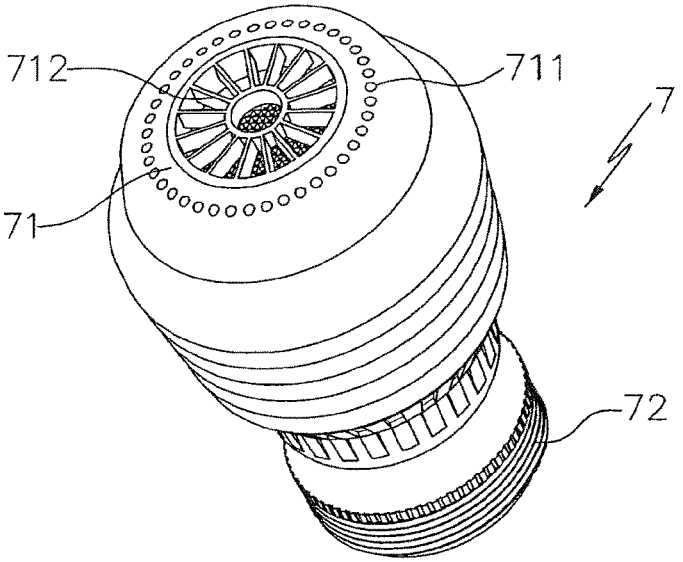
PRIOR ART FIG.3A
FIG. 3A is a schematic view showing the structure of a conventional aerator with both bubbling spray and needle-like spray.
Figure 3B:
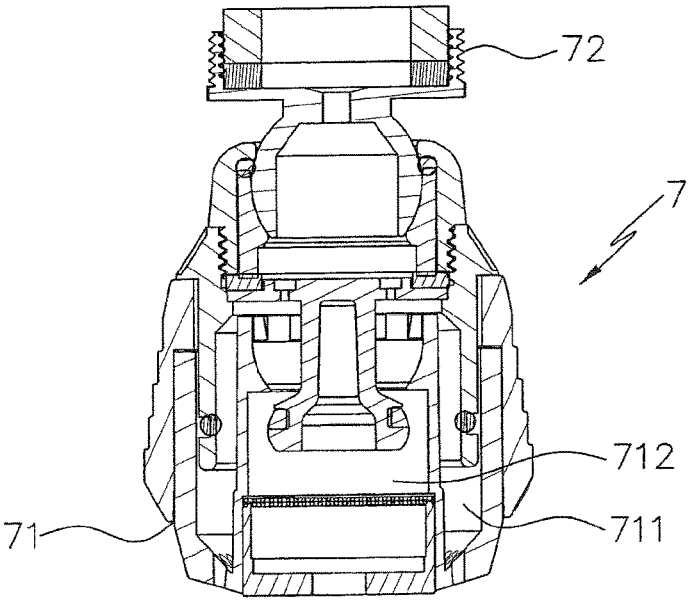
PRIOR ART FIG.3B
FIG. 3B is a cross-sectional view showing the structure of a conventional aerator with both bubbling spray and needle-like spray.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

As shown in FIGS. 4A-7, the present invention discloses a flow control included aerator with dual spraying functions of needle-like spray and bubbling spray, comprising a housing 2, a flow control assembly 3, a water separator 4, a water dispenser 5, and a water dispensing net 6. The flow control assembly 3 and the water separator 4 are combined together and the water separator 4 and the water dispenser 5 are rotatably connected together. The water dispensing net 6 is mounted to a lower portion of the water dispenser 5. The flow control assembly 3, the water separator 4, the water dispenser 5, and the water dispensing net 6, after being assembled together, collectively constitute an inner core assembly that is combinable with the housing 2, whereby the housing 2 may connect, through the sealing gasket 1, the inner core assembly to a product of for example a basin faucet, a kitchen faucet, a pull-out faucet, a spraying gun, a bidet, and a showerhead with a sealing function achieved at the connection.

Figure 4A:
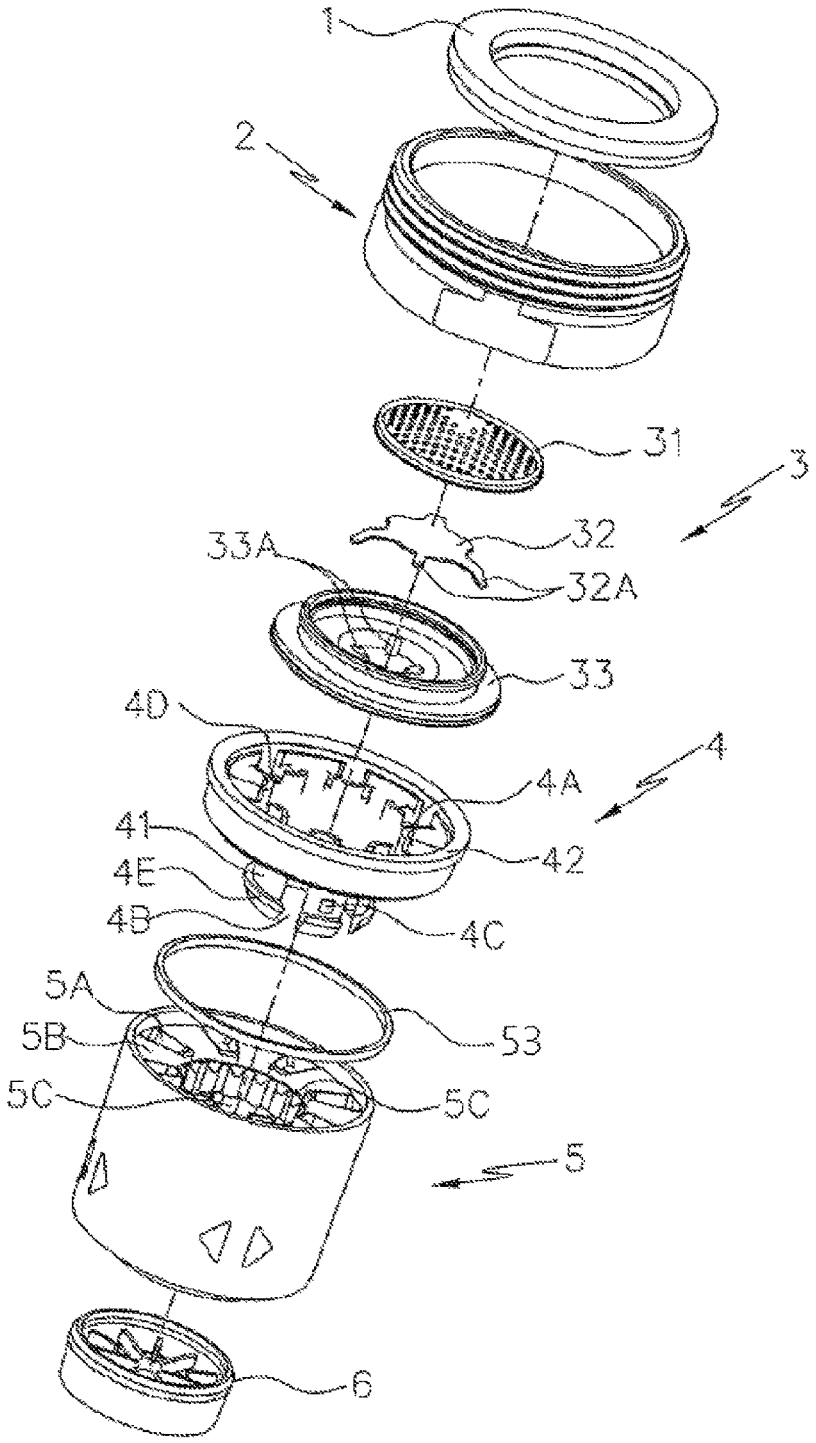
FIG. 4A is an exploded view of the present invention.
Figure 4B:
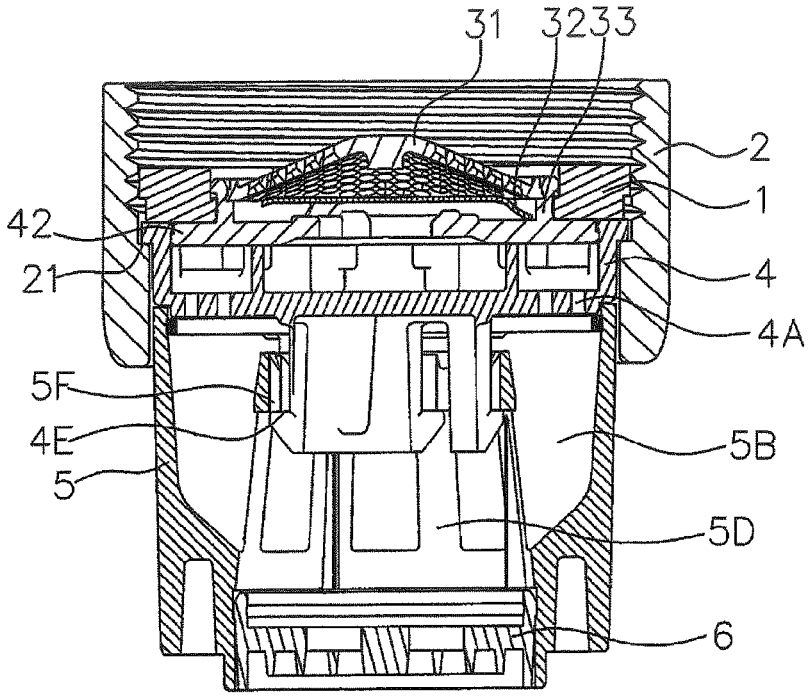
FIG. 4B is a cross-sectional view showing a bubbling spray condition of the present invention.
Figure 4C:
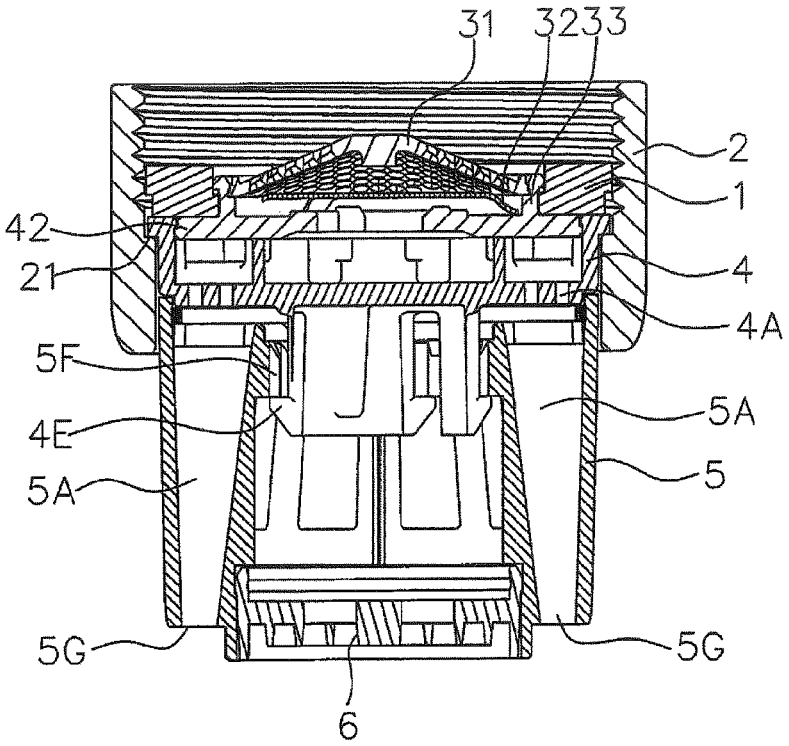
FIG. 4C is a cross-sectional view showing a needle-like spray condition of the present invention.

The housing 2 is provided with a thread, which can be an internal thread or an external thread according to the need of a product, as shown in FIGS. 4B and 4C.

Referring to FIG. 4A, the flow control assembly 3 provides a function of controlling the flow rate and comprises a top lid 31, an elastic body 32, and a bottom base 33. The elastic body 32 comprises a stainless steel spring plate having a circumference from which at least two pawls 32A extend downward. In this embodiment, the pawls 32A are arranged in an unsymmetrical manner to prevent resonance resulting from symmetry. The top lid 31 coves atop the bottom base [3] *33* with the elastic body 32 interposed between the bottom base 33 and the top lid 31. The top lid [3] *31* comprises through apertures 31 formed therein. The bottom base 33 has a non-central portion on which at least one raised peg 33A is formed to prevent failure of the elastic body 32 due to overloading resulting from water pressure exceeding and thus preventing discharge holes formed in the bottom base 33 from being blocked by the spring plate. The operation is as follows. The pawls 32A formed on the circumference of the elastic body 32 are arranged as downward extending structures so that when the elastic body 32 is placed in the bottom base 33, a central portion of the elastic body 32 is raised and suspended to allow water to flow through a space between a side edge of the elastic body 32 and the bottom base 33. When water pressure increases, the elastic body 32 undergoes elastic deformation that is gradually increased so that the lateral side area through which water may flow is gradually decreased. According to the formula: flow=flow speed×area through which water flows, when the water pressure is increasing, although the flow speed is increased, the area through which water flows is gradually reduced, the flow rate can be maintained substantially constant. Such flow controlling allows water flow to provide similar spraying effect for both low pressure and high pressure, making it energy saving and environment conservative.

Figure 5A:
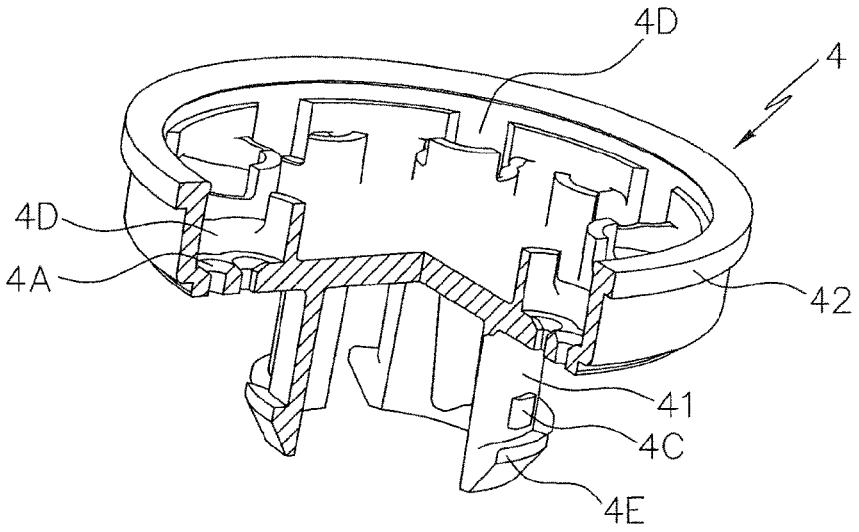
FIG. 5A is a perspective view, partially broken, showing a water separator according to the present invention.
Figure 5B:
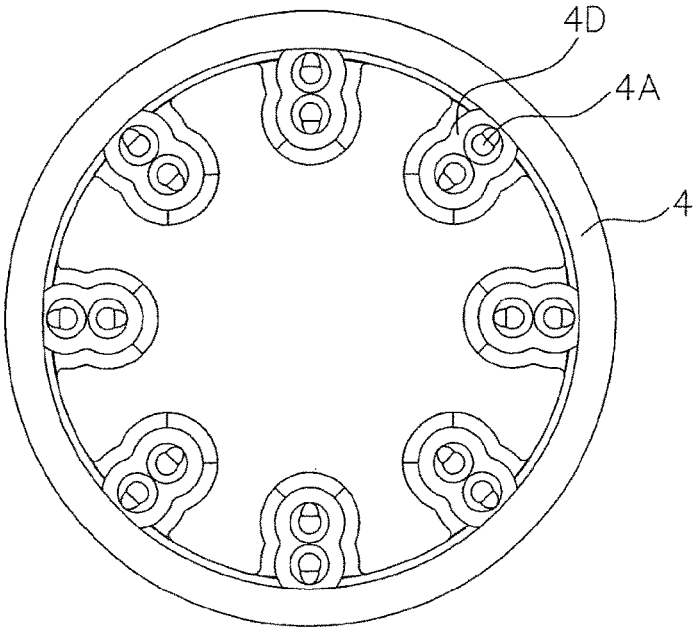
FIG. 5B is a top plan view of the water separator of the present invention.
Figure 5C:
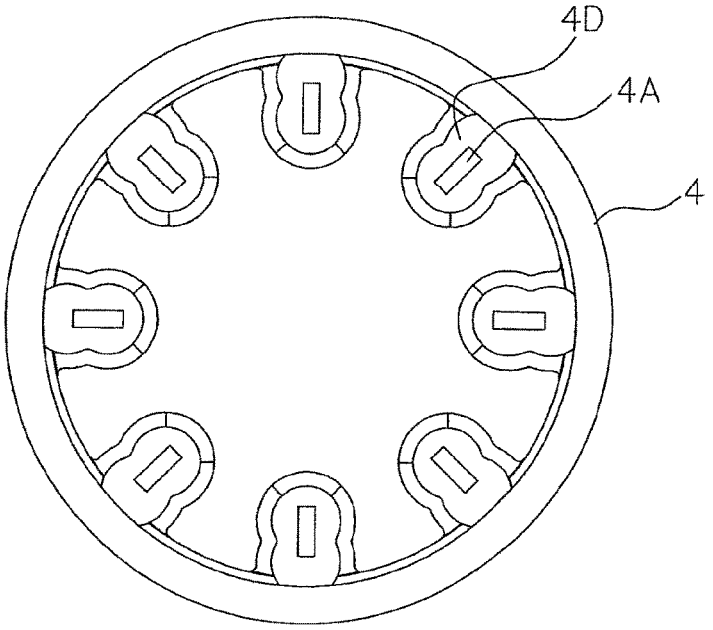
FIG. 5C is a top plan view showing another structure of a water separator according to the present invention.

Referring to FIGS. 5A-5C, the water separator 4 comprises a T-shaped disk having a disk surface in which discharge holes 4A are formed in an equally spaced manner in an area adjacent to a circumference of the disk. Each of the discharge holes has an upper end, where an energy accumulation pool 4D is formed. The energy accumulation pool 4D allows water to flow in a faster discharging speed thereby achieving a negative pressure of a larger range. The water separator 4 has a central portion on an underside of which posts 41 that comprise resilient cutoffs 4B and barbs 4E are formed so that the posts 41 are easily pressed into the water dispenser 5 and are difficult to withdraw out. Further, positioning projections 4C are formed on outside surfaces of the posts 41 of the water separator 4 to correspond to positioning recesses 5C formed the water dispenser 5, which will be described hereinafter for purposes of temporary positioning and preventing undesired rotation between the water separator 4 and the water dispenser 5 and also achieving accurate positioning for needle-like spray and bubbling spray. On the undersurface of the disk of the water separator 4, a reduced neck portion is formed for being received in and positioned on an upper end of the water dispenser 5 for connection therebetween. As [show] *shown* in FIGS. 5A and 5B, two adjacent discharge holes 4A is formed in each individual energy accumulation pool *4D* of the water separator 4 to define a water jet. Such a combination helps form a negative area of an even larger range. The above two points allow air and water to be sufficiently mixed to generate a large amount of bubbling spray so that the spray is more compliant and fuller. Alternatively, as shown in FIG. 5C, an elongate discharge hole 4A is formed in each individual energy accumulation pool *4D* of the water separator 4 and this similarly provides a negative area of a larger range.

Figure 6A:
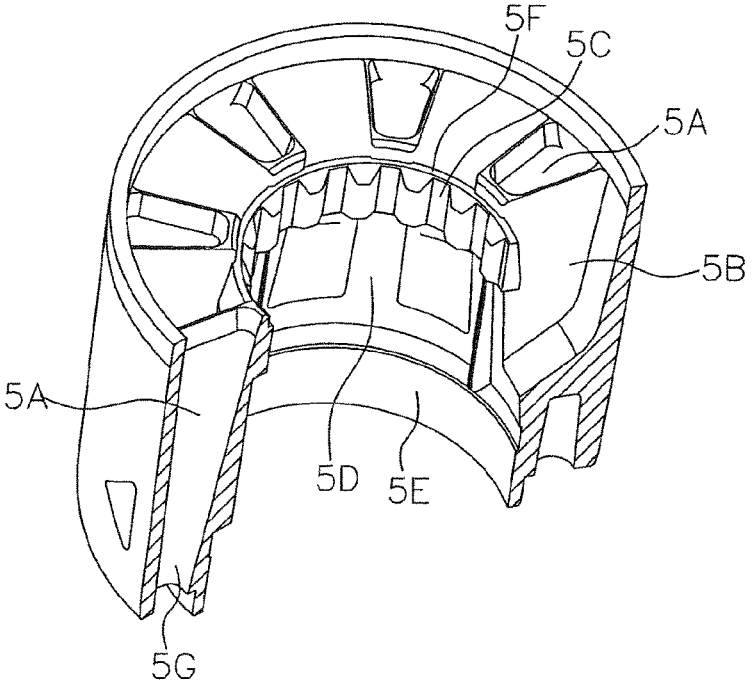
FIG. 6A is a perspective view, partially broken, showing a water dispenser according to the present invention.
Figure 6B:
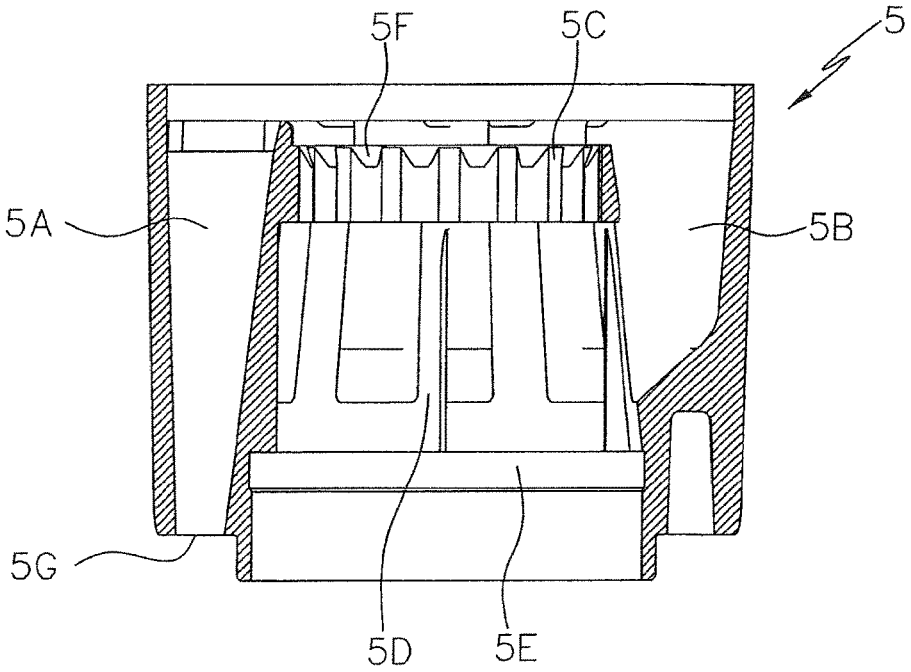
FIG. 6B is a cross-sectional view showing the water dispenser according to the present invention.

Referring to FIGS. 6A and 6B, the water dispenser 5 comprises a sleeve having an internal chamber that is provided, in a circumferential portion thereof, with uniformly distributed needle-like water channels 5A respectively corresponding to the discharge holes 4A of the water separator 4. Formed in a lower end of the water dispenser 5 to correspond to the needle-like water channels 5A are needle-like water discharge holes 5G. The needle-like water channels 5A are each arranged to reduce from a large-sized upper end toward a small-sized lower end. Bubbling water passages 5B are formed between the needle-like water channels 5A. A central portion surrounded by the needle-like water channels 5A defines a bubbling water channel 5D. Further, a portion of the water dispenser 5 located under the bubbling water channel 5D forms discharge holes 5E, which mates the water dispensing net 6 that comprise grid-like discharge holes, or alternatively, grid-like discharge holes can be directly formed on the discharge holes 5E. Upper inside surfaces of the needle-like water channels 5A are connected to each other by an inner circumferential wall 5F and the inner circumferential wall 5F comprise positioning recess 5C formed on an inner side thereof. The barbs 4E of the posts 41 of the water dispenser 4 engage a lower end of the inner circumferential wall 5F. Further, the needle-like water channels 5A of the water dispenser 5 has a minimum water discharge cross-sectional area that is greater than a minimum water discharge cross-sectional area of the discharge holes 4A of the water separator 4. Further, a ring pad [51] *53* that mates an outer circumference of the bottom of the water separator 4 is arranged between the water dispenser 5 and the water separator 4 to ensure water flows of the bubbling water passage 5B can be better converged in the bubbling water channel 5D. The arrangement of the water dispenser 5 provides the aerator with two types of sprays including needle-like spray and bubbling spray.

To assemble, the water separator 4 is provided along an outer circumference thereof with the formation of a flange 42, which cooperates with a retention step 21 formed in an inside circumference of the housing 2 to achieve combination of the inner core assembly with the housing 2 in such a way that a clearance fitting is formed between the water dispenser 5 and the housing 2. A maximum outside diameter of the entire inner core assembly is smaller than the inner diameter of the thread of the housing 2 to allow the water dispenser 5 to directly fit into the housing 2 of the aerator. After fit into the housing 2, the water dispenser 5 has a portion extending outside the housing 2, whereby the portion extending outside the housing 2 allows for hand gripping for rotation to achieve switching between two spraying functions of needle-like spray and bubbling spray.

Figure 7:
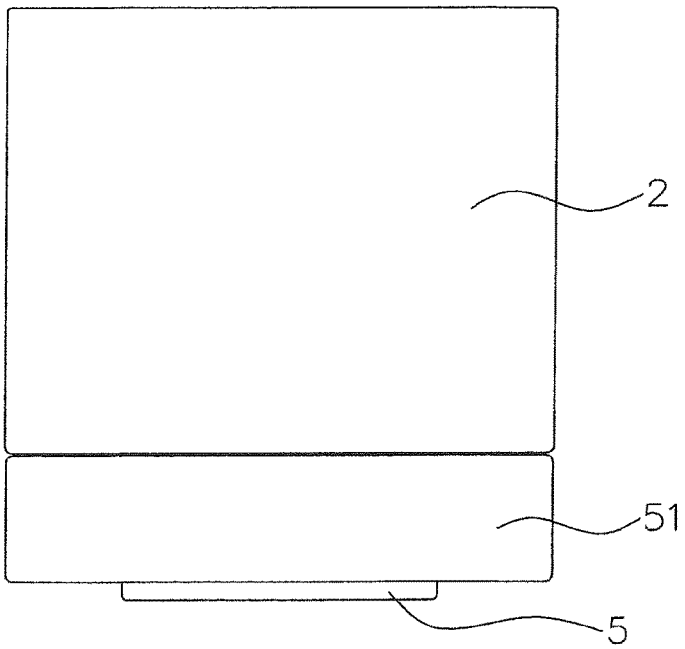
FIG. 7 is a schematic view showing an aerator according to the present invention.

As shown in FIG. 7, to enhance the outside appearance of the entirety of the aerator, [a] *the* decoration ring 51 having an outside diameter matching the housing 2 is fit over the portion of the water dispenser 5 that extends outside the housing 2.

Flow channels of the water separator 4, the water dispenser 5, and the water dispensing net 6 are in communication with each other and no sealing structure is needed to allow easy entry of air into the flow channels to form bubbling spray. Thus, the two spraying functions of the aerator of the present invention is switchable through rotation and during the use and the process of switching, the needle-like water channels 5A and the bubbling water channel 5D of the water dispenser 5 are in communication with the external atmosphere and no sealing structure is necessary among them.

The operation of the present invention is as follows. Water flows through and is subjected to control by the flow control assembly 3 and then enters the water separator 4. The water then gets into the energy accumulation pool 4D of the water separator 4 for pressure regulation and is then jetted through the discharge holes 4A that are uniformly distributed in the water separator 4.

As shown in FIG. [4B] *4C*, in case of being manually switched to needle-like spraying condition, the discharge holes 4A of the water separator 4 are in alignment with the needle-like water channels 5A of the water dispenser. Since the minimum water discharge cross-sectional area of the needle-like water channels 5A of the water dispenser 5 is greater than the minimum water discharge cross-sectional area of the discharge holes 4A of the water separator 4, water flows jetted through the discharge holes 4A of the water separator 4 move along the angles of the needle-like water channels 5A of the water dispenser to be jetted through the needle-like water discharge holes 5G, not overflowing to the large-sized ends of the needle-like water channels 5A of the water dispenser 5. This helps eliminates the sealing requirement for the needle-like water channels 5A and other communicating spaces.

As shown in FIG. [4C] *4B*, in case of manually switching to the bubbling spraying condition, the water dispenser 5 is rotated in such a way that the discharge holes 4A of the water separator 4 are set in alignment with the bubbling water passages 5B of the water dispenser 5, whereby water flows through the bubbling water passages 5B into the bubbling water channel 5D, wherein under such a condition, air is allowed to move from outside of the water separator 4 and the needle-like water discharge holes 5G into the negative area so that air can be sufficiently mixed with the fast water flows through the discharge holes 4A of the water separator 4 to achieve the formation of bubbling spray. The bubbling spray flows through the water dispensing net 6 and is shaped thereby to form full and smooth cylinder like bubbling spray.

In summary, the present invention comprises needle-like water channels 5A and a bubbling water channel 5D that are arranged in the water dispenser 5 to be alignable with the discharge holes 4A of the water separator 4 and in communication with the outside atmosphere and achieves switching through rotation by means of a water separator 4 and a water dispenser 5 that are rotatable with respect to each other so as to achieve selective switching between needle-like spray and bubbling spray. The rotation switching helps extend the service life of a product. The housing 2 is combinable with a faucet, a spraying gun, a pull-out sprinkler, and a bidet, having excellent commonality and simplified structure. The arrangement of a flow control assembly 3 helps provide similar spraying effect for water spray with both low pressure and high pressure and achieve energy saving and environmental conservation.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

[1. An aerator with dual spraying functions, characterized by comprising a housing, a flow control assembly, a water separator, and a water dispenser, wherein the flow control assembly and the water separator are combined together and the water separator and the water dispenser are rotatably connected together, the water dispenser having a lower portion to which a water dispensing net is mounted; the flow control assembly, the water separator, and the water dispenser are combined with the housing to be coupled, via a sealing gasket, to a water discharge device, the water dispenser being arranged to partially extend outside the housing; the water separator comprises a T-shaped disk having a disk surface in which discharge holes are formed in an equally spaced manner in an area adjacent to a circumference of the disk, each of the discharge holes having an upper end, where an energy accumulation pool is formed; and the water dispenser comprises a sleeve having an internal chamber that is provided, in a circumferential portion thereof, with uniformly distributed needle-like water channels respectively corresponding to the discharge holes of the water separator, needle-like water discharge holes being formed in a lower end of the water dispenser to correspond to the needle-like water channels, bubbling water passages being formed between the needle-like water channels, a central portion surrounded by the needle-like water channels defining a bubbling water channel, grid-like discharge holes being mounted to discharge holes at a lower end of the bubbling water channel.]

[2. The aerator with dual spraying functions according to claim 1, characterized in that the water dispensing net that comprises grid-like discharge holes is mounted to the discharge holes of a lower end of the water dispenser.]

[3. The aerator with dual spraying functions according to claim 1, characterized in that the flow control assembly comprises a top lid, an elastic body, and a bottom base, wherein the elastic body has a circumference from which at least two pawls extend downward, the top lid covering atop the bottom base with the elastic body interposed between the bottom base and the top lid, the top lid comprising through apertures formed therein, the bottom base having a non-central portion on which at least one raised peg is formed.]

[4. The aerator with dual spraying functions according to claim 1, characterized in that two adjacent discharge holes are formed in each individual energy accumulation pool of the water separator to define a water jet.]

[5. The aerator with dual spraying functions according to claim 1, characterized in that an elongate discharge hole is formed in each individual energy accumulation pool of the water separator.]

[6. The aerator with dual spraying functions according to claim 1, characterized in that upper inside surfaces of the needle-like water channels are connected to each other by an inner circumferential wall, inner circumferential wall comprising positioning recesses formed on an inner side thereof.]

[7. The aerator with dual spraying functions according to claim 1, characterized in that the water separator has a central portion on an underside of which posts that comprise resilient cutoffs and barbs are formed and positioning projections are formed on outside surfaces of the posts.]

[8. The aerator with dual spraying functions according to claim 7, characterized in that two adjacent discharge holes are formed in each individual energy accumulation pool of the water separator to define a water jet.]

[9. The aerator with dual spraying functions according to claim 7, characterized in that an elongate discharge hole is formed in each individual energy accumulation pool of the water separator.]

[10. The aerator with dual spraying functions according to claim 7, characterized in that upper inside surfaces of the needle-like water channels are connected to each other by an inner circumferential wall, inner circumferential wall comprising positioning recesses formed on an inner side thereof.]

[11. The aerator with dual spraying functions according to claim 1, characterized in that the needle-like water channels of the water dispenser are arranged to reduce from a large-sized upper end toward a small-sized lower end.]

[12. The aerator with dual spraying functions according to claim 11, characterized in that upper inside surfaces of the needle-like water channels are connected to each other by an inner circumferential wall, inner circumferential wall comprising positioning recesses formed on an inner side thereof.]

[13. The aerator with dual spraying functions according to claim 1, characterized in that the needle-like water channels of the water dispenser has a minimum water discharge cross-sectional area that is greater than a minimum water discharge cross-sectional area of the discharge holes of the water separator.]

[14. The aerator with dual spraying functions according to claim 1, characterized in that a ring pad that mates an outer circumference of the bottom of the water separator is arranged between the water dispenser and the water separator.]

[15. The aerator with dual spraying functions according to claim 1, characterized in that the water dispenser that partially extends outside the housing comprises a decoration ring fit thereto.]

*16. An aerator with dual spraying functions, comprising a water separator, and a water dispenser, wherein the water separator and the water dispenser are rotatably connected together; first discharge holes are distributed on the water separator; needle-like water channels are uniformly distributed on the water dispenser to correspond to the first discharge holes on the water separator; second discharge holes are formed in a lower end of the water dispenser to correspond to the needle-like water channels; bubbling water passages are formed between the needle-like water channels; a central portion surrounded by the needle-like water channels defines a bubbling water channel; the needle-like water channels, the bubbling water passages and the bubbling water channel communicate with one another and communicate with the external atmosphere,*

*wherein the water dispenser is a T-shaped disc.*

*17. The aerator with dual spraying functions according to claim 16, also comprising a flow control assembly, the flow control assembly being matched together with the water separator.*

*18. The aerator with dual spraying functions according to claim 17, also comprising a housing, wherein the flow control assembly, the water separator and the water dispenser are assembled with the housing, and then are matched with a water dispensing device through a sealing gasket.*

*19. The aerator with dual spraying functions according to claim 18, wherein the water dispenser extends out of the housing, and the water dispenser portion that partially extends outside the housing comprises a decoration ring fit thereto.*

*20. The aerator with dual spraying functions according to claim 17, wherein the flow control assembly comprises a top lid, an elastic body, and a bottom base, wherein the elastic body has a circumference from which at least two pawls extend downward, the top lid covering atop the bottom base with the elastic body interposed between the bottom base and the top lid, the top lid comprising through apertures formed therein, the bottom base having a non-central portion on which at least one raised peg is formed.*

*21. The aerator with dual spraying functions according to claim 16, further comprising a water dispensing net, wherein the water dispensing net is mounted at the lower part of the water dispenser.*

*22. The aerator with dual spraying functions according to claim 16, wherein the first discharge holes are arranged in groups in which the first discharge holes are adjacent to each other, and energy accumulation pools are respectively formed at an upper end of each group of the first discharge holes.*

*23. The aerator with dual spraying functions according to claim 22, wherein two adjacent first discharge holes are formed to form a water column in each individual energy accumulation pool of the water separator.*

*24. The aerator with dual spraying functions according to claim 22, wherein energy accumulation pools are respectively formed at the upper end of each first discharge hole, and each first discharge hole is an elongate discharge hole.*

*25. The aerator with dual spraying functions according to claim 16, wherein fourth grid-like discharge holes are formed at positions of third discharge holes of a lower end of each bubbling water passage.*

*26. The aerator with dual spraying functions according to claim 16, further comprising:*

*a water dispensing net comprising fourth grid-like discharge holes and is mounted to third discharge holes at a lower end of each bubbling passage.*

*27. The aerator with dual spraying functions according to claim 16, wherein the water separator has a central portion on an underside of which posts that comprise resilient cutoffs and barbs are formed and positioning projections are formed on outside surfaces of the posts.*

*28. The aerator with dual spraying functions according to claim 16, wherein the needle-like water channels of the water dispenser are arranged to reduce from a large-sized upper end toward a small-sized lower end.*

*29. The aerator with dual spraying functions according to claim 16, wherein the upper inside surfaces of the needle-like water channels are connected to each other by an inner circumferential wall, the inner circumferential wall comprising positioning recesses formed on an inner side thereof.*

*30. The aerator with dual spraying functions according to claim 16, wherein the needle-like water channels of the water dispenser have a minimum water discharge cross-sectional area that is greater than a minimum water discharge cross-sectional area of the first discharge holes of the water separator.*

*31. The aerator with dual spraying functions according to claim 16, wherein a ring pad that mates an outer circumference of the bottom of the water separator is arranged between the water dispenser and the water separator.*

*32. The aerator with dual spraying functions according to claim 16, wherein the first discharge holes are distributed on the water separator at an equal interval, and the needle-like water channels are distributed on the water dispenser at an equal interval to correspond to the first discharge holes.*

*33. The aerator with dual spraying functions according to claim 16, wherein the water dispenser is a post sleeve.*

* * * * *